US011242884B2

(12) United States Patent
Mohan et al.

(10) Patent No.: US 11,242,884 B2
(45) Date of Patent: Feb. 8, 2022

(54) SEALING WEDGE-LOCK WASHER AND FASTENING SYSTEM

(71) Applicant: Laitram, L.L.C., Harahan, LA (US)

(72) Inventors: Jake A. Mohan, Grand Rapids, MI (US); Michael Hendrik DeGroot, Rockford, MI (US); Jeff Batchelder, Hesperia, MI (US)

(73) Assignee: Laitram, L.L.C., Harahan, LA (US)

( * ) Notice: Subject to any disclaimer, the term of this patent is extended or adjusted under 35 U.S.C. 154(b) by 399 days.

(21) Appl. No.: 16/574,904

(22) Filed: Sep. 18, 2019

(65) Prior Publication Data
US 2021/0079946 A1 Mar. 18, 2021

(51) Int. Cl.
*F16B 39/24* (2006.01)
*F16B 43/00* (2006.01)
*F16B 39/282* (2006.01)

(52) U.S. Cl.
CPC .......... *F16B 39/24* (2013.01); *F16B 43/001* (2013.01); *F16B 39/282* (2013.01)

(58) Field of Classification Search
CPC ...... F16B 33/004; F16B 39/24; F16B 39/282; F16B 43/001; Y10S 411/915
USPC ........................................................ 411/542
See application file for complete search history.

(56) References Cited

U.S. PATENT DOCUMENTS

| 3,540,509 | A | * | 11/1970 | Gutshall | ................. | F16B 39/24 |
|---|---|---|---|---|---|---|
| | | | | | | 411/145 |
| 3,605,845 | A | * | 9/1971 | Junker | ................. | F16B 39/282 |
| | | | | | | 411/185 |
| 4,443,145 | A | | 4/1984 | Peschges | | |
| 4,702,657 | A | | 10/1987 | Jelinek | | |
| 5,011,351 | A | | 4/1991 | Terry | | |
| 5,080,545 | A | | 1/1992 | McKinlay | | |
| 5,203,656 | A | | 4/1993 | McKinlay | | |
| 5,626,449 | A | | 5/1997 | McKinlay | | |
| 6,173,969 | B1 | | 1/2001 | Stoll et al. | | |
| D602,349 | S | | 10/2009 | Andersson | | |
| 8,216,076 | B2 | | 7/2012 | Andersson | | |
| 9,239,074 | B2 | | 1/2016 | Lauer et al. | | |

(Continued)

FOREIGN PATENT DOCUMENTS

CN 107477072 A 12/2017
DE 2431760 A1 11/1974

(Continued)

OTHER PUBLICATIONS

Heico-Lock Wedge Locking Systems brochure, HEICO Befestigungstechnik GmbH, Ense-Niederense, Germany, May 2018.

(Continued)

*Primary Examiner* — Roberta S Delisle
(74) *Attorney, Agent, or Firm* — James T. Cronvich

(57) ABSTRACT

A sealing wedge-lock washer assembly usable in a hygienic, secure fastening system. A wedge-lock washer assembly comprises two wedge-lock components—one of which is a sealing wedge-lock washer having a wedge-lock cam and a sealing material bonded to its outer rim. The other component is a standard wedge-lock washer or a bolt whose head has a wedge-lock cam that engages the complementary cam on the sealing wedge-lock washer. The resulting sealing wedge-lock washer assembly locks a bolt in a secure joint that is hygienically sealed from the intrusion of contaminants by the sealing material.

34 Claims, 4 Drawing Sheets

(56) References Cited

U.S. PATENT DOCUMENTS

| | | | |
|---|---|---|---|
| 9,366,284 B2 | 6/2016 | Delcher | |
| 9,636,738 B2 | 5/2017 | Andersson | |
| 9,683,595 B2 | 6/2017 | Chalandon et al. | |
| 9,732,782 B2 | 8/2017 | Andersson et al. | |
| 9,845,821 B2 | 12/2017 | Andersson | |
| 9,909,608 B2 | 3/2018 | Michiwaki | |
| 10,508,679 B2 * | 12/2019 | Andersson | F16B 43/00 |
| 2004/0131443 A1 | 7/2004 | Terry | |
| 2007/0128003 A1 * | 6/2007 | Shiu | F16B 39/282 |
| | | | 411/533 |
| 2007/0196195 A1 * | 8/2007 | Lin | F16B 39/282 |
| | | | 411/161 |
| 2007/0243040 A1 * | 10/2007 | Chen | F16B 39/282 |
| | | | 411/161 |
| 2008/0014046 A1 * | 1/2008 | Bauer | F16B 39/282 |
| | | | 411/164 |
| 2008/0310932 A1 | 12/2008 | McIntyre et al. | |
| 2010/0098511 A1 | 4/2010 | Andersson | |
| 2010/0290857 A1 | 11/2010 | Smolarek et al. | |
| 2011/0170983 A1 * | 7/2011 | Day | F16B 39/24 |
| | | | 411/370 |
| 2011/0274514 A1 * | 11/2011 | Lee | F16B 43/00 |
| | | | 411/368 |
| 2013/0170922 A1 * | 7/2013 | Persson | F16B 39/24 |
| | | | 411/161 |
| 2013/0243544 A1 * | 9/2013 | Delcher | F16B 39/282 |
| | | | 411/154 |
| 2014/0348609 A1 * | 11/2014 | Chen | F16B 41/005 |
| | | | 411/209 |
| 2015/0023764 A1 | 1/2015 | Lauer et al. | |
| 2015/0252828 A1 | 9/2015 | Hurst | |
| 2016/0003287 A1 * | 1/2016 | Andersson | F16B 39/24 |
| | | | 411/149 |
| 2016/0160904 A1 * | 6/2016 | Lee | F16B 39/282 |
| | | | 411/332 |
| 2018/0023614 A1 * | 1/2018 | Andersson | F16B 43/00 |
| | | | 411/545 |
| 2019/0120281 A1 | 4/2019 | Lutter | |
| 2019/0178284 A1 * | 6/2019 | Davis | F16B 39/24 |
| 2019/0234446 A1 * | 8/2019 | Chang | F16B 39/24 |
| 2019/0234447 A1 * | 8/2019 | Chang | F16B 41/002 |

FOREIGN PATENT DOCUMENTS

| | | |
|---|---|---|
| DE | 19508977 A1 | 7/1996 |
| DE | 29715844 U1 | 10/1997 |
| DE | 102011120724 A1 | 6/2013 |
| DE | 202012103313 U1 | 1/2014 |
| DE | 202012104410 U1 | 3/2014 |
| DE | 202013104117 U1 | 1/2015 |
| DE | 102015210516 A1 | 12/2016 |
| DE | 202019106592 U1 | 12/2019 |
| EP | 2791517 B1 | 9/2015 |
| EP | 2894358 B1 | 8/2017 |
| EP | 2983865 B1 | 5/2018 |
| GB | 1284078 A | 8/1972 |
| JP | 50-1253 A | 1/1975 |
| JP | 51-021068 U1 | 2/1976 |
| JP | 2000-27837 A | 1/2000 |
| SE | 445062 B | 5/1986 |
| WO | 200165128 A1 | 9/2001 |
| WO | 2004033139 A2 | 4/2004 |
| WO | 2018167026 | 9/2018 |

OTHER PUBLICATIONS

Nord-Lock Wedge-Locking Solutions brochure, NORD-LOCK Group, 2019.
Sealing Technology Manual for the Process Industry, Freudenberg Sealing Technologies, Weinheim, Germany, 2017.
International Search Report and Written Opinion of the International Searching Authority, PCT/US2020/043732, dated Oct. 6, 2020, European Patent Office, NL, Rijswijk.

* cited by examiner

SEALING WEDGE-LOCK WASHER AND FASTENING SYSTEM

BACKGROUND

The invention relates generally to fasteners and in particular to wedge-lock and sealing washers.

Fastener hardware, such as screws, bolts, nuts, and washers, are used throughout conveyor frames. In the food industry, where food safety is important, bolts cause problems. First, bolts can loosen with vibration and contaminate products. Second, bolts form non-hermetically sealed joints that can harbor bacteria. Third, bolt threads are not cleanable and can harbor bacteria.

Belt loosening is often eliminated with wedge-lock washers, such as NORD-LOCK® washers manufactured and sold by Nord-Lock International AB of Malmö, Sweden. With a pair of wedge-lock washers with confronting contacting wedge faces under the head of a tightened bolt, any tendency of the bolt to loosen under vibration is counteracted by the corresponding action of the washers to expand axially and increase the clamping force to tighten the connection. This occurs because the wedge angle of the washers is greater than the pitch angle of the bolt threads. But wedge-lock washers have many bacteria-harborage zones.

Sealing washers are often used to hermetically seal joints. Sealing washers are made by bonding an oversized elastomeric or other sealing material to the outside diameter of a flat washer. One example of such a sealing washer is the Freudenberg Hygienic USIT® washer manufactured by Freudenberg SE of Weinheim, Germany. But sealing washers are not designed to prevent bolts from loosening.

SUMMARY

A sealing wedge-lock washer embodying features of the invention comprises a wedge-lock washer having an outer rim and a sealing material affixed to the outer rim.

A sealing wedge-lock assembly embodying features of the invention comprises a wedge-lock component including an annular cam face having cam wedges arranged about an axis and a sealing wedge-lock component including an annular cam face having cam wedges arranged about an axis, an outer rim, and a sealing material affixed to the outer rim. The cam wedges on the cam face of the sealing wedge-lock component are complementary in shape to the cam wedges on the cam face of the wedge-lock component to form a wedge-lock engagement.

A fastening system embodying features of the invention comprises a bolt having a head and a shank extending axially from the head and a first sealing wedge-lock washer disposed between the head of the bolt and a workpiece through which the bolt is inserted and having a sealing material on an outer rim.

DETAILED DESCRIPTION

Figure 1:
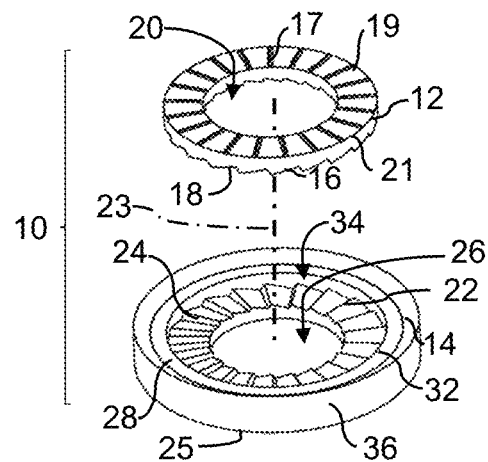
FIG. 1 is an exploded view of one version of a sealing wedge-lock washer assembly embodying features of the invention.
Figure 2:
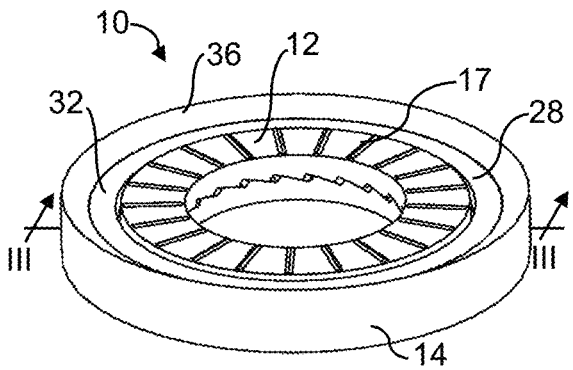
FIG. 2 is an oblique view of the washer assembly of FIG. 1.
Figure 3:
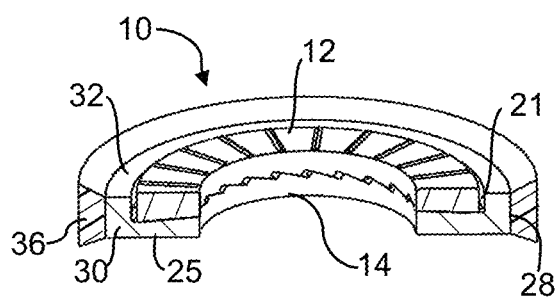
FIG. 3 is a cross-sectional view of the washer assembly of FIG. 2.

A sealing wedge-lock washer assembly embodying features of the invention is shown in FIGS. 1-3. The assembly 10 comprises a wedge-lock washer 12 and a sealing wedge-lock washer 14. The wedge-lock washer 12 has cam wedges 16 on a cam face 18 and serrations 17 on an obverse face 19. Both faces 17, 19 extend radially outward from a smooth central axial bore 20 to an outer rim 21 that defines the washer's outer diameter. The bore 20 has an axis 23. The sealing wedge-lock washer 14 has cam wedges 22 on a cam face 24 and also has an obverse face 25. The cam wedges 16, 22 form a sawtooth pattern around the cam faces 18, 24 with a shallow slope on one side of each peak and a steep slope on the other side.

The obverse faces of both washers 12, 14 may be smooth, roughened, or textured with serrations as in FIGS. 1-3. Each serration 17 shown in this example is symmetric about a radial axis. But each serration could be formed asymmetrically like the wedges 16, 22, but reduced in scale, to provide directionality.

The cam face 24 and the obverse face 25 of the sealing wedge-lock washer 14 extend radially outward from a smooth central bore 26 defining an inner diameter. The inner diameters of the bores 20, 26 of both washers 12, 14 are generally the same. The obverse face 25 of the sealing wedge-lock washer 14 extends radially outward from the bore 26 to an outer rim 28 that defines the washer's outer diameter. The outer diameter of the sealing wedge-lock washer 14 is greater than the outside diameter of the wedge-lock washer 12. A circular lip 30, or ring, extends radially inward from the outer rim 28 and axially from the obverse face 25 and past the cam face 24 to a distal edge 32. The cam face 24 extends radially from the central axial bore 26 to the lip 30 and forms a recess 34 radially and axially inward of the lip's distal edge 32. The lip's inside diameter is slightly greater than the outside diameter of the wedge-lock washer 12, enough for the wedge-lock washer 12 to be received in the recess 34 with the cam faces 18, 24 confronting each other.

Affixed to the metal outer rim 28 of the sealing wedge-lock washer 14 is a bead of sealing material 36. The sealing material 36 is a compliant material, such as a rubber or elastomeric material, that compresses and stretches radially outward when squeezed between rigid bodies. Examples are EPDM (ethylene propylene diene monomer), PTFE (polytetrafluoroethylene), and synthetic or natural rubbers. The sealing material is affixed to the outer rim 28 by bonding, such as adhesive-bonding, overmolding, or vulcanizing, for example.

Figure 4A:
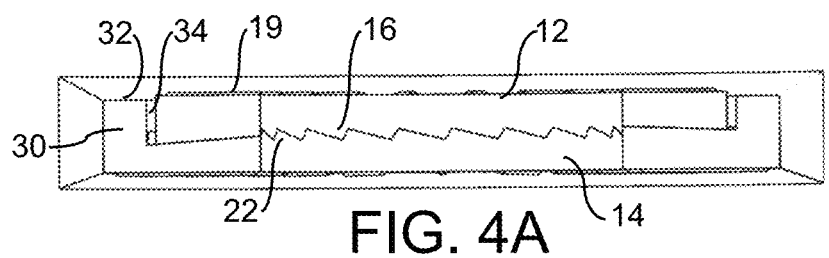
FIGS. 4A and 4B are side elevation views of the washer assembly of FIG. 2 in bottomed-out and wedging positions.
Figure 4B:

The operation of the wedge lock is shown in FIGS. 4A and 4B. In FIG. 4A the wedge-lock washer 12 is shown bottomed out in the recess 34 of the sealing wedge-lock washer 14. In the bottomed-out configuration, the cam wedges 16 of the wedge-lock washer 12 mesh with the complementary cam wedges 22 of the sealing wedge-lock washer 14. And the obverse face 19 of the wedge-lock washer 12 protrudes out of the recess 34 slightly axially outward of the level of the distal edge 32 of the circular lip 30. Relative axial rotation between the wedge-lock washer 12 and the sealing wedge-lock washer 14 causes sliding between the engaged cam wedges 16, 22 along their shallow ramps 38 as shown in FIG. 4B. The sliding motion causes the wedge-lock washer 12 to start moving along the ramps 38, to protrude farther out of the recess 34 with its obverse face 19 farther outward of the distal edge 32 of the sealing wedge-lock washer's circular lip 30.

Figure 5:
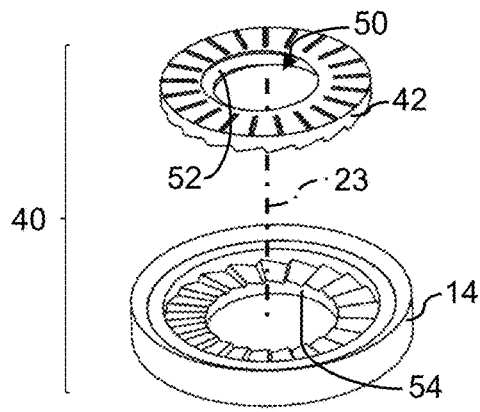
FIG. 5 is an exploded view of a second version of a sealing wedge-lock washer assembly embodying features of the invention.
Figure 6:
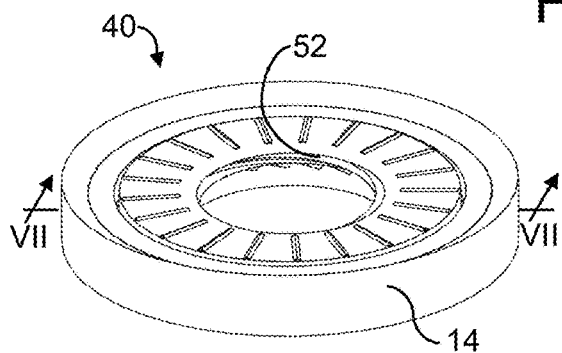
FIG. 6 is an oblique view of the washer assembly of FIG. 5.
Figure 7:
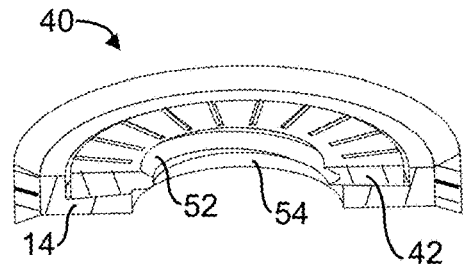
FIG. 7 is a cross-sectional view of the washer assembly of FIG. 6.

FIGS. 5-7 depict a sealing wedge-lock washer assembly 40 as in FIGS. 1-3. The only difference is that the wedge-lock washer 42 has a central axial bore 50 that includes internal threads 52 on the bore wall. The sealing wedge-lock washer 24 is the same as in FIGS. 1-3 with a smooth bore wall 54 about the axis 23. Alternatively, the bore wall 54 of the sealing wedge-lock washer could be threaded and the bore wall of the wedge-lock washer could be smooth. The inner diameter of the smooth-bore washer is greater than the inner diameter of the threaded-bore washer.

Figure 8:
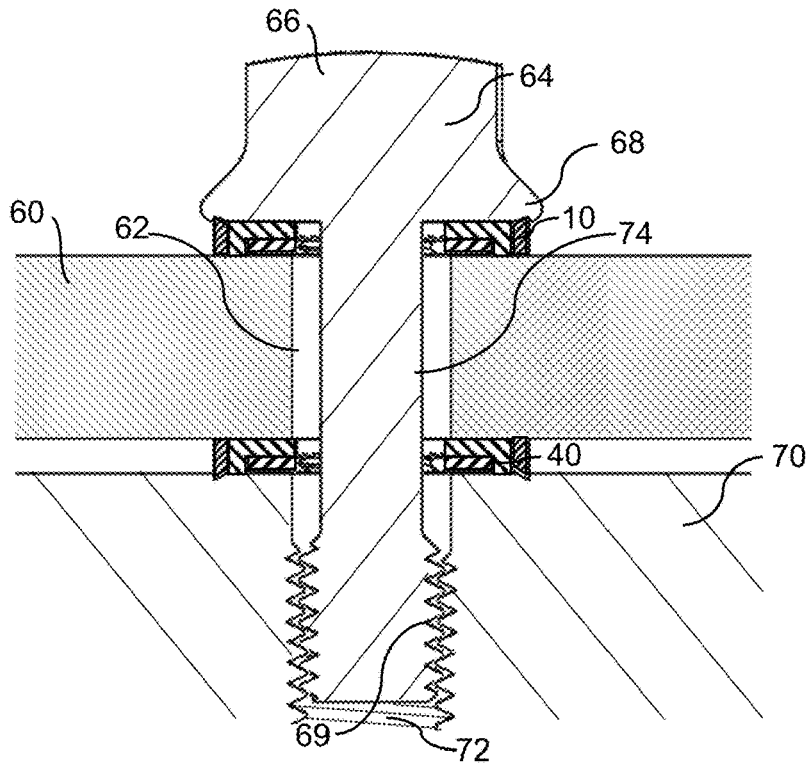
FIG. 8 is a cross-sectional view of a fastening system using sealing wedge-lock washer assemblies as in FIGS. 2 and 6.

A fastening system for bolting two workpieces to each other using the sealing wedge-lock washer assemblies 10, 40 of FIGS. 1-3 and 5-7 is shown in FIG. 8. A smooth-bore sealing wedge-lock washer assembly 10 is positioned between the head 64 of a bolt 66 or screw and a first workpiece 60 having a through hole 62. The bolt head in this example has a flange 68 broadening its base. The bolt 66 extends through the through hole 62 in the first workpiece. Threads 69 at the end of the bolt 66 engage threads in a threaded hole 72 in a second workpiece 70. A second sealing wedge-lock washer assembly 40 is optionally positioned between the first and second workpieces 60, 70. In this example the bolt 66 is a reduced-shank bolt having an unthreaded shank 74 between the bolt head 64 and the bolt threads 69. The outer diameter of the shank 74 is less than the outer diameter of the threads 69. The sealing wedge-lock washer assembly 40 with a threaded bore can be retained on the unthreaded shank 74 to prevent it from falling from the bolt 66 when disengaged from the second workpiece 70.

Figure 15:
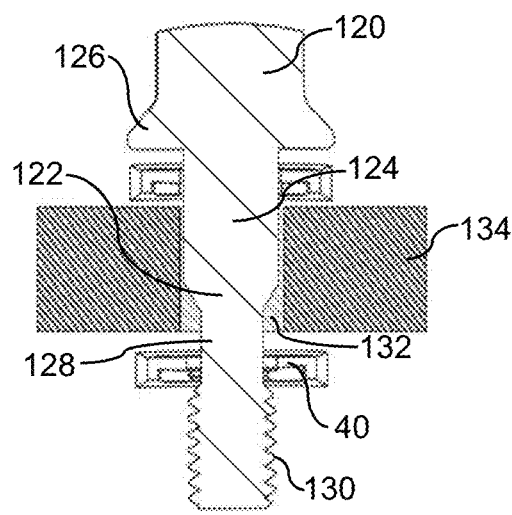
FIG. 15 is a cross-sectional view of a fastening system using sealing wedge-lock washer assemblies as in FIG. 8 with a bolt having a dual-diameter shank.

A similar fastening system is shown in FIG. 15. The only difference is that the bolt 120 has a dual-diameter shank 122. A first length 124 of the shank has a full diameter extending axially from the bolt's head 126. A second length 128 of the shank 122 between the first length 124 and the threads 130 has a reduced diameter that is less than the full diameter of the first length 124 and less that the outside diameter of the threads. The full-diameter first length 124 of the shank 122, whose diameter is slightly less than the diameter of a hole 132 through a first workpiece 134 to be fastened, helps center the bolt 120 in the hole. The reduced-diameter second length 128 receives the threaded sealing washer assembly 40 confined between the full-diameter length 124 and the threads 130.

One exemplary sequence of fastening the first workpiece 60 to the second workpiece 70 in reference to FIG. 8 is as follows:
1. The smooth-bore sealing wedge-lock washer assembly 10 is slid onto the bolt 66. (The inner diameter of the assembly is greater than the outer diameter of the bolt threads 69.)
2. The bolt 66 is inserted into and through the through hole 62 in the first workpiece 60. The sealing wedge-lock washer assembly 10 is sandwiched between the bolt head 64 and the first workpiece 60.
3. The sealing wedge-lock washer assembly 40 with the threaded bore is threaded onto and past the bolt threads 69 until it reaches the reduced-diameter shank 74. The sealing wedge-lock washer assembly 40 is retained on the bolt's shank 74 by the threads 69 and can't fall off. The washer assembly 40 can be removed only by intentionally unscrewing it along the threads 69.
4. The through hole 62 in the first workpiece 60 is aligned with the threaded hole 72 in the second workpiece 70.
5. The bolt 66 is then inserted in the threaded hole 72 and tightened to compress the sealing material 36 of the two sealing wedge-lock washer assemblies 10, 40 between the bolt head 64 and the first workpiece 60 and between the first workpiece and the second workpiece 70.

The fastening system described secures the first workpiece 60 to the second workpiece 70 in a connection that resists loosening due to vibration or other environmental effects by the wedge-locking engagement of the wedge-locking assemblies 10, 40. And the compressed sealing material 36 on the outer rims of the assemblies 10, 40 forms a hygienic seal preventing the intrusion of contaminants into the joints. So the sealing wedge-lock assemblies 10, 40 provide the benefits of both wedge-lock washers and sealing washers.

Figure 9A:
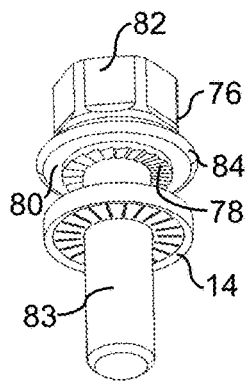
FIGS. 9A and 9B are rearward and forward tilted views of another version of a sealed wedge-lock assembly embodying features of the invention.
Figure 9B:
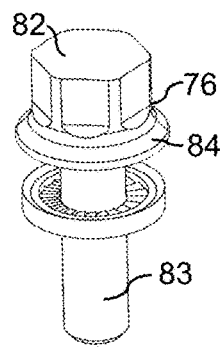
Figure 10:
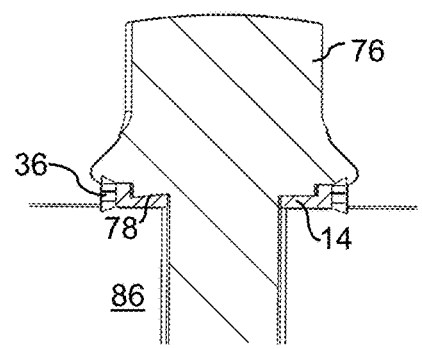
FIG. 10 is a cross-sectional view of the sealing wedge-lock assembly of FIGS. 9A and 9B used in a fastening system.

Another wedge-lock system is shown in FIGS. 9A and 9B. In this version a bolt 76 has an integral cam face 78 with cam wedges extending axially outward of a base 80 on a head 82 of the bolt. The bolt has a shank 83 that extends from the center of the base 80. The head 82 of the bolt 76 has a flange 84 broadening the base 80. The cam wedges are received in a sealing wedge-lock washer 14 as in FIG. 1. Because the cam wedges are integral with the bolt 76, a separate wedge-lock washer 12 as in FIG. 1 is not needed to form a sealed wedge-locked joint as in FIG. 10. The bolt 76 is shown tightened through a workpiece 86. The cam face 78 of the bolt 76 is shown bottomed out in the sealing wedge-lock washer 14. The compressed sealing material 36 forms a seal at the joint between the bolt head 82 and the workpiece 86. Thus, in this version the two sealing wedge-lock components are the sealing wedge-lock washer 14 and the wedge-lock bolt 76 rather than the sealing wedge-lock washer 14 and the wedge-lock washer 12 of FIG. 1.

Figure 11:
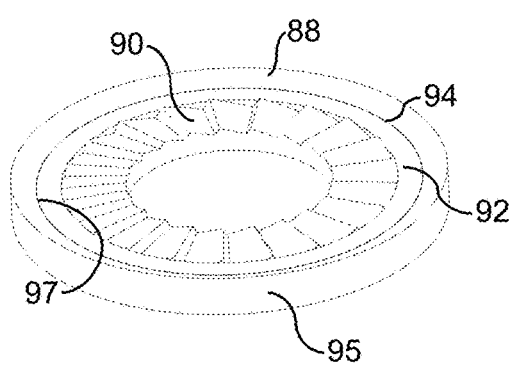
FIG. 11 is an oblique view of another version of a sealing wedge-lock washer embodying features of the invention.
Figure 12A:
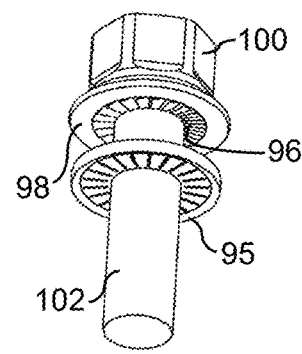
FIGS. 12A and 12B are rearward and forward tilted views of another version of a sealed wedge-lock assembly using the sealing wedge-lock washer of FIG. 11.
Figure 12B:
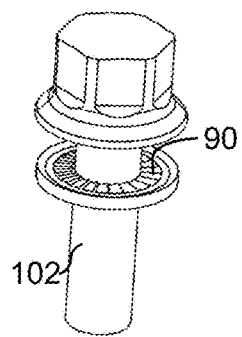

Another washer-and-bolt sealing wedge-lock assembly is shown in FIGS. 12A and 12B using a sealing wedge-lock washer 88 as in FIG. 11. In this version the sealing wedge-lock washer 88 does not include a lip. Instead, its cam wedges 90 are generally flush with a face 92 of an outer ring 94, whose axial thickness is constant. The outer ring 94 extends radially inward from an outer rim 97 to the cam wedges 90 on the washer's opposite faces. Sealing material 95 is bonded to the ring's narrow outer rim 97. The peaks of the cam wedges 90 extend axially outward beyond the outer ring's face 92, but the valleys are recessed axially inward. Similarly, cam wedges 96 on the base 98 of the head 100 of a bolt 102 are generally flush with the base 98 of the bolt's head 100. The peaks of both cam wedges 90, 96 extend axially far enough out to meet the recessed valleys of the other cam wedge when the bolt head's cam wedges 96 bottom out in the sealing wedge-lock washer's cam wedges 90.

Figure 13:
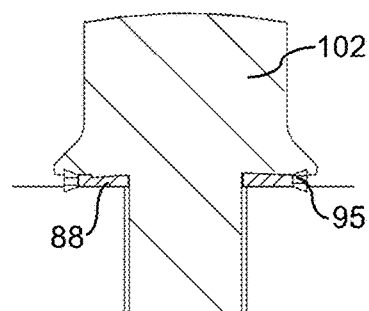
FIG. 13 is a cross-sectional view of a fastening system using a sealing wedge-lock washer as in FIG. 11 and a cam face on a bolt head.
Figure 14:
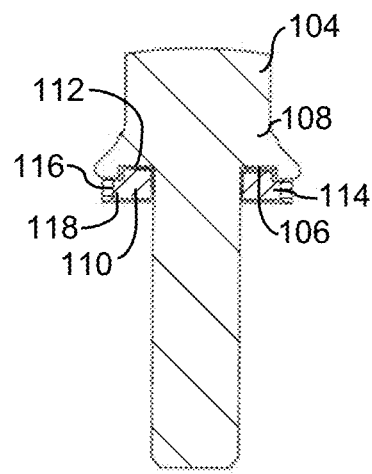
FIG. 14 is a cross-sectional view of a fastening system as in FIG. 13, but with a bolt having a deeply recessed cam face and a sealing wedge-lock washer having a protruding cam face.

A fastening system using the wedge-lock bolt 102 and sealing wedge-lock washer 88 of FIGS. 12A and 12B is shown in FIG. 13. Its operation is the same as shown for the wedge-lock bolt 76 and sealing wedge-lock washer 14 of FIG. 10. A similar fastening system is shown in FIG. 14. In this version a wedge-lock bolt 104 has a deeply recessed cam face 106 at the base of the bolt's head 108. A sealing wedge-lock washer 110 has a cam face 112 that extends axially outward of the washer's outer ring 114. Like the sealing wedge-lock washer 88 of FIG. 11, the sealing wedge-lock washer of FIG. 14 has a sealing material 116 bonded to its outer rim 118.

Figure 16:
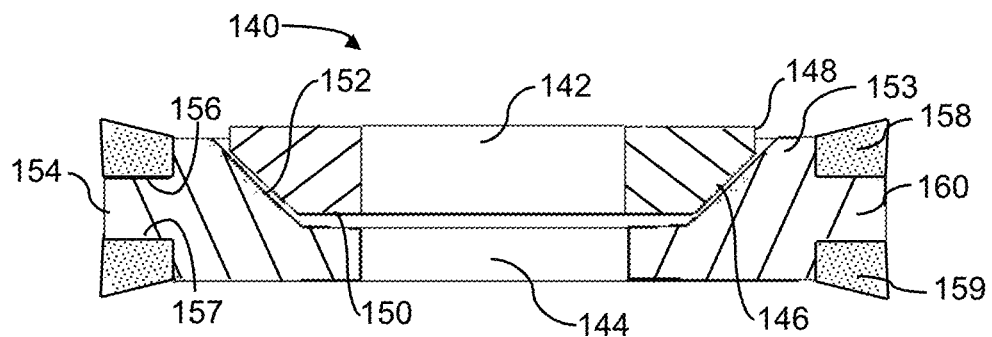
FIG. 16 is a cross-sectional view of another version of a sealing wedge-lock washer assembly embodying features of the invention.

Yet another version of a sealing wedge-lock washer assembly is shown in FIG. 16. The assembly 140 comprises a wedge-lock washer 142 and a sealing wedge-lock washer 144. The wedge-lock washer 142 has a beveled circumferential surface 146 between the washer's outer rim 148 and its cam face 150. The sealing wedge-lock washer 144 has a complementary angled inner surface 152 on its ring 153 angled to accommodate the beveled surface 146 of the wedge-lock washer 142. The sealing wedge-lock washer 144 has an outer rim 154 with upper and lower corner cutouts 156, 157 to which upper and lower circumferential beads 158, 159 of sealing material are bonded. The two beads 158, 159, which fill and protrude outward of the cutouts 156, 157, are separated by an intervening portion 160 of the outer rim 154 between the two cutouts.

Although the invention has been described in detail with respect to illustrative embodiments, other versions are possible. For example, in FIG. 8 the wedge-lock washer is positioned against the first workpiece 60, and the sealing wedge-lock washer is positioned against the bolt head 64. But the assembly could be reversed. The same reversal is possible with the sealing wedge-lock assembly 40 between the first and second workpieces 60, 70. In that case, the sealing wedge-lock washer, instead of the wedge-lock washer, would have the threaded bore. And the dual sealing beads bonded at the corner cutouts in the sealing wedge-lock washer of FIG. 16 could be applied to other sealing wedge-lock washers without angled inner surfaces. Wedge-lock cams can be formed on components other than washers and bolts. For example, they can be formed on screws, flanged nuts, wing nuts, thumb nuts, standoffs, studs, spacers, flanged inserts, and other fastening hardware. And the term "bolt" is used generically in the claims to refer to any threaded and headed fastener.

What is claimed is:

1. A sealing wedge-lock washer comprising:
   a wedge-lock washer having an outer rim;
   a sealing material affixed to the outer rim;
   an annular first face extending radially outward from a central axial bore;
   an obverse annular second face extending radially outward from the central axial bore;
   a ring extending radially inward from the outer rim to the first face;
   wherein a series of wedges is formed on the second face in a circular pattern about the central axial bore.

2. A sealing wedge-lock washer as claimed in claim 1 wherein the sealing material includes PTFE, EPDM, or a natural or synthetic rubber material.

3. A sealing wedge-lock washer as claimed in claim 1 wherein the sealing material is affixed to the outer rim by adhesive-bonding, overmolding, or vulcanizing.

4. A sealing wedge-lock washer as claimed in claim 1 wherein the ring extends radially inward to the second face.

5. A sealing wedge-lock washer as claimed in claim 1 wherein the ring has a face that is generally flush with the second face.

6. A sealing wedge-lock washer as claimed in claim 1 wherein the ring extends axially outward of the second face.

7. A sealing wedge-lock washer as claimed in claim 1 wherein the second face extends axially outward of the ring.

8. A sealing wedge-lock washer as claimed in claim 1 wherein the ring has an angled inner surface.

9. A sealing wedge-lock washer as claimed in claim 1 wherein the ring extends axially from the first face and past the second face and wherein the second face extends radially outward to the ring.

10. A sealing wedge-lock washer as claimed in claim 9 wherein a pattern of directional serrations is formed on the first face.

11. A sealing wedge-lock washer as claimed in claim 1 wherein the sealing material forms a single circumferential bead around the outer rim.

12. A sealing wedge-lock washer as claimed in claim 1 wherein the sealing material forms two circumferential beads around the outer rim.

13. A sealing wedge-lock assembly comprising:
    a wedge-lock component including an annular cam face having cam wedges arranged about an axis;
    a sealing wedge-lock component including an annular cam face having cam wedges arranged about an axis, an outer rim, and a sealing material affixed to the outer rim;
    wherein the cam wedges on the cam face of the sealing wedge-lock component are complementary in shape to the cam wedges on the cam face of the wedge-lock component to form a wedge-lock engagement.

14. A sealing wedge-lock assembly as claimed in claim 13 wherein the wedge-lock component is a bolt and the sealing wedge-lock component is a washer mounted on the bolt.

15. A sealing wedge-lock assembly as claimed in claim 14 wherein the bolt has a head with a base and a shank extending from the base of the head and wherein the cam face is formed on the head of the bolt at the base.

16. A sealing wedge-lock assembly as claimed in claim 15 wherein the cam wedges of the bolt extend axially outward of the head of the bolt at the base.

17. A sealing wedge-lock assembly as claimed in claim 15 wherein the cam wedges of the bolt are recessed into the head of the bolt at the base.

18. A sealing wedge-lock assembly as claimed in claim 15 wherein the cam wedges of the bolt are generally flush with the head of the bolt at the base.

19. A sealing wedge-lock assembly as claimed in claim 13 wherein the cam wedges of the sealing wedge-lock component are radially inward of and extend axially outward of the outer rim.

20. A sealing wedge-lock assembly as claimed in claim 13 wherein the wedge-lock component is a wedge-lock washer having an obverse face extending with the cam face from a central axial bore to an outer rim defining an outer diameter and wherein the sealing wedge-lock component is a sealing wedge-lock washer including:
- an obverse face extending from a central axial bore to the outer rim defining an outer diameter greater than the outer diameter of the wedge-lock washer;
- a circular lip radially inward of the outer rim and extending axially from the obverse face and past the cam face of the sealing wedge-lock washer to a distal edge;
- wherein the cam face extends from the central axial bore to the circular lip and is recessed radially and axially inward of the distal edge of the circular lip.

21. A sealing wedge-lock assembly as claimed in claim 20 wherein, when the cam wedges on the cam face of the wedge-lock washer are in contact with the cam wedges on the cam face of the sealing wedge-lock washer, the obverse face of the wedge-lock washer is axially outward of the distal edge of the circular lip of the sealing wedge-lock washer.

22. A sealing wedge-lock assembly as claimed in claim 20 wherein the cam wedges on the cam face of the wedge-lock washer are recessed into the cam face of the sealing wedge-lock washer.

23. A sealing wedge-lock assembly as claimed in claim 13 wherein the wedge-lock component is a wedge-lock washer having an obverse face extending with the cam face from a central axial bore to an outer rim defining an outer diameter and wherein the sealing wedge-lock component is a sealing wedge-lock washer including:
- an obverse face extending from a central axial bore to the outer rim defining an outer diameter greater than the outer diameter of the wedge-lock washer;
- a ring extending radially inward of the outer rim;
- a cam face extending from the central axial bore to the ring.

24. A sealing wedge-lock assembly as claimed in claim 23 wherein the sealing material comprises two circumferential beads bonded to the outer rim.

25. A sealing wedge-lock assembly as claimed in claim 23 wherein the wedge-lock washer has a beveled surface and the sealing wedge-lock washer has an angled inner surface angled to accommodate the beveled surface of the wedge-lock washer.

26. A fastening system comprising:
- a bolt having a head and a shank extending axially from the head;
- a first sealing wedge-lock washer disposed between the head of the bolt and a workpiece through which the bolt is inserted and having a sealing material on an outer rim;
- wherein the bolt includes a cam face having cam wedges on the head of the bolt extending radially outward from the shank and wherein the first sealing wedge-lock washer has a cam face with cam wedges that mesh with the cam wedges on the cam face of the bolt.

27. A fastening system as claimed in claim 26 wherein the bolt has a flanged head.

28. A fastening system as claimed in claim 26 for fastening a first workpiece to a threaded second workpiece wherein:
- the bolt has threads at an end of the shank opposite the head;
- a first sealing wedge-lock washer assembly mounted on the bolt between the head and a first workpiece to be attached to a second workpiece and including a first wedge-lock washer and the first sealing wedge-lock washer having the sealing material affixed to the outer rim, wherein the first wedge-lock washer engages the first sealing wedge-lock washer in wedge-lock engagement;
- wherein the bolt extends through the first workpiece and is threaded into a threaded hole in the second workpiece tightly enough to lock the bolt to the second workpiece with the first sealing wedge-lock washer assembly and to compress the sealing material and form a seal between the head of the bolt and the first workpiece.

29. A fastening system as claimed in claim 28 wherein the first wedge-lock washer contacts the first workpiece and the first sealing wedge-lock washer contacts the head of the bolt.

30. A fastening system as claimed in claim 28 wherein the first sealing wedge-lock washer assembly has a smooth bore with a diameter greater than the outer diameter of the threads on the bolt.

31. A fastening system as claimed in claim 28 comprising:
- a second sealing wedge-lock washer assembly mounted on the bolt between the first workpiece and the threads and including a second wedge-lock washer and a second sealing wedge-lock washer having a sealing material affixed to an outer rim, wherein the second wedge-lock washer engages the second sealing wedge-lock washer in wedge-lock engagement;
- wherein the bolt is threaded tightly enough to the second workpiece to further lock the bolt to the second workpiece with the second sealing wedge-lock assembly and to compress the sealing material and form a seal between the first workpiece and the second workpiece.

32. A fastening system as claimed in claim 31 wherein the second wedge-lock washer contacts the second workpiece and the second sealing wedge-lock washer contacts the first workpiece.

33. A fastening system as claimed in claim 31 wherein the bolt is a reduced-shank bolt having a threadless shank between the head and the threads whose diameter is less than the outer diameter of the threads and wherein the second sealing wedge-lock washer has a threaded bore that can be threaded along the threads of the bolt and onto the shank.

34. A fastening system as claimed in claim 31 wherein the bolt has a threadless shank between the head and the threads, wherein the shank has a first diameter in a first length of the shank extending from the head and a smaller second diameter in a second length of the shank between the first length and the threads, wherein the second sealing wedge-lock washer has a threaded bore that can be threaded along the threads of the bolt and onto the second length of the shank.

* * * * *